US008258432B2

(12) United States Patent
Narayanan

(10) Patent No.: US 8,258,432 B2
(45) Date of Patent: Sep. 4, 2012

(54) WELDING TRIP STEELS

(75) Inventor: Badri K. Narayanan, Columbus, OH (US)

(73) Assignee: Lincoln Global, Inc., City of Industry, CA (US)

( * ) Notice: Subject to any disclaimer, the term of this patent is extended or adjusted under 35 U.S.C. 154(b) by 625 days.

(21) Appl. No.: 12/397,694

(22) Filed: Mar. 4, 2009

(65) Prior Publication Data

US 2010/0227196 A1 Sep. 9, 2010

(51) Int. Cl.
*B23K 9/23* (2006.01)
*B23K 35/30* (2006.01)
*B23K 35/36* (2006.01)

(52) U.S. Cl. .......... 219/137 WM; 219/136; 219/146.23

(58) Field of Classification Search .......... 219/137 WM, 219/137 R, 136, 145.1, 145.22, 146.1, 146.23
See application file for complete search history.

(56) References Cited

U.S. PATENT DOCUMENTS

| | | | | |
|---|---|---|---|---|
| 5,369,244 | A * | 11/1994 | Kulikowski et al. | 219/145.22 |
| 5,505,796 | A | 4/1996 | Kawano et al. | |
| 5,744,782 | A * | 4/1998 | Sampath et al. | 219/146.1 |
| 6,190,469 | B1 * | 2/2001 | Koh et al. | 148/500 |
| 6,328,826 | B1 | 12/2001 | Iung et al. | |
| 6,475,408 | B1 | 11/2002 | Denis et al. | |
| 6,767,652 | B2 | 7/2004 | Yamamoto et al. | |
| 7,126,077 | B2 | 10/2006 | Wang | |
| 7,455,736 | B2 * | 11/2008 | Kashima et al. | 148/320 |
| 2005/0081966 | A1 | 4/2005 | Kashima et al. | |
| 2005/0150580 | A1 * | 7/2005 | Akamizu et al. | 148/654 |
| 2005/0230361 | A1 * | 10/2005 | Wang et al. | 219/117.1 |
| 2006/0130937 | A1 | 6/2006 | Ikeda et al. | |
| 2008/0023112 | A1 | 1/2008 | Kashima | |
| 2008/0199347 | A1 | 8/2008 | Barges et al. | |
| 2008/0237198 | A1 * | 10/2008 | Edwards | 219/86.33 |
| 2008/0251161 | A1 | 10/2008 | Kashima et al. | |
| 2008/0257110 | A1 | 10/2008 | Becker et al. | |

OTHER PUBLICATIONS

Chatterjee, S. "Transformations in TRIP-assisted Steels: Microstructure and Properties", Darwin College, University of Cambridge, Nov. 2006, 53 pgs.
Chatterjee, et al., "Transformation induced plasticity assisted steels: stress or strain affected martensitic transformation?", Institute of Materials, Minerals and Mining, 4 pgs., 2007.
Chen et al., "Transmission Electron Microscopy and Nanoindentation Study of the Weld Zone Microstructure of Diode-Laser-Joined Automotive Transformation-Induced Plasticity Steel", Metallurgical and Materials Transactions A, vol. 39A, pp. 593-603, Mar. 2008.
Dimatteo et al., "Microstructures and properties of TRansformation Induced Plasticity steels", la metallurgia italia, pp. 37-41, dated Nov. 12, 2006.
Francis et al., "Transformation Temperatures and Welding Residual Stresses in Ferritic Steels", Proceedings of PVP2007, 2007 ASME Pressure Vessels and Piping Division Conference, Jul. 22-26, 2007, San Antonio, Texas, 8 pgs.
"Arc welding", 7 page web printout, Wikipedia, printed on Dec. 11, 2008.
"TRIP Steels", 4 pages web printout, University of Cambridge, printed on Dec. 11, 2008.

* cited by examiner

*Primary Examiner* — M. Alexandra Elve
(74) *Attorney, Agent, or Firm* — Calfee, Halter & Griswold, LLP

(57) ABSTRACT

Welds made in TRIP steel workpieces by non-autogenous welding techniques can be made to approximate both the composition and microstructure of the TRIP steel being welded by formulating the weld to have controlled amounts of γ phase (austenite) stabilizers and cementite suppressors.

17 Claims, 3 Drawing Sheets

WELDING TRIP STEELS

BACKGROUND

Transformation Induced Plasticity (or "TRIP") steels exhibit greater strengths and ductilities relative to other high-strength steels, both before and after plastic deformation. These features make TRIP steels ideally suited for use in fabricating automobile parts of complex shape, since such parts can be made stronger and lighter than if made with other high-strength steels. In addition, such parts exhibit superior crash performance because of their superior strength and ductility.

TRIP steels are primarily made up of three microconstituents: polygonal ferrite, bainite and a dispersed austenite phase supersaturated with carbon. Depending on the alloy content, martensite may also be present at room temperature. Plastic deformation of these steels, such as occurs during stamping or the like, causes the dispersed austenite to transform into martensite. Because this dispersed austenite/martensites phase is supersaturated with carbon, the steel is stronger than comparable high strength steels, both before and after plastic deformation. Moreover, because the transformed martensite is smaller than the retained austenite, there is a volume change that accompanies this transformation. This volume change increases the plasticity of the steel which in turn enhances formability, i.e., the ability to transform the steel into complex shape by plastic deformation. This volume change also enhances uniform ductility, i.e., the ability of the steel after plastic deformation to absorb additional applied stress through plastic flow such as would occur, for example, in a collision. The presence of high carbon martensite also provides the strength for these steels. The presence of retained austenite also improved crash worthiness by absorbing energy to transform into martensite.

The vast majority of sheet steel parts in automobiles and trucks are assembled by resistance spot welding (RSW), although laser welding is becoming increasingly popular. Both of these techniques are autogenous welding processes, i.e., processes in which no filler material is used. Unfortunately, when TRIP steels are welded, neither technique can produce welds exhibiting the same microstructure as the base metal being welded See, for example, Chen et al., Transmission Electron Microscopy and Nanoindentation Study of the Weld Zone Microstructure of Diode-Laser-Joined Automotive Transformation-Induced Plasticity Steel, *Metallurgical and Materials Transactions A*, Vol. 39 A, March 2008, pp 593-603. Although controlling the cooling rate of the weld has been suggested to overcome this problem (See, U.S. 2008/0203139), this approach is too cumbersome to be practical commercially. Moreover, autogenous welding is inherently limited in terms of deposition rates as well as the size of the gap that can be filled, since no filler material is used.

SUMMARY

In accordance with this invention, it has been found that the welds made in TRIP steel workpieces can be made to approximate both the composition, microstructure and physical properties of the TRIP steel being welded by forming the weld using non-autogenous welding techniques and selecting as the welding wire used in this process a welding wire having an appropriate balance between its cementite suppressors (e.g., Al and Si) and its austenite stabilizers (e.g., Mn and Ni).

Thus, this invention provides a non-autogenous arc welding process for forming a weld in a workpiece made from a TRIP steel in which an iron-based filler material is melted by an electric arc in the presence of a flux and the molten material formed thereby solidified to form the weld, wherein the filler material and flux are selected so that the weld obtained exhibits an ultimate tensile strength of at least about 100 ksi and a % elongation of at least about 15%.

In addition, this invention also provides a welded article comprising a workpiece made from a TRIP steel, the workpiece having a continuous iron-based weld made by a non-autogenous welding process, wherein the weld contains about 0.02 to 0.20 wt. % C, about 1.0-6.0 wt. % Al and Si, and about 1.0-6.0 wt. % Ni and Mn, wherein the weight ratio of the austenite stabilizers (e.g., Ni +Mn) to the cementite suppressors (e.g., Al and Si) is about 2:1-1:2, the weld exhibiting an ultimate tensile strength of at least about 100 ksi and a % elongation of at least about 15%.

BRIEF DESCRIPTION OF THE DRAWINGS

This invention may be more readily understood by reference to the following drawings wherein.

DETAILED DESCRIPTION

TRIP Steels

Figure 1:
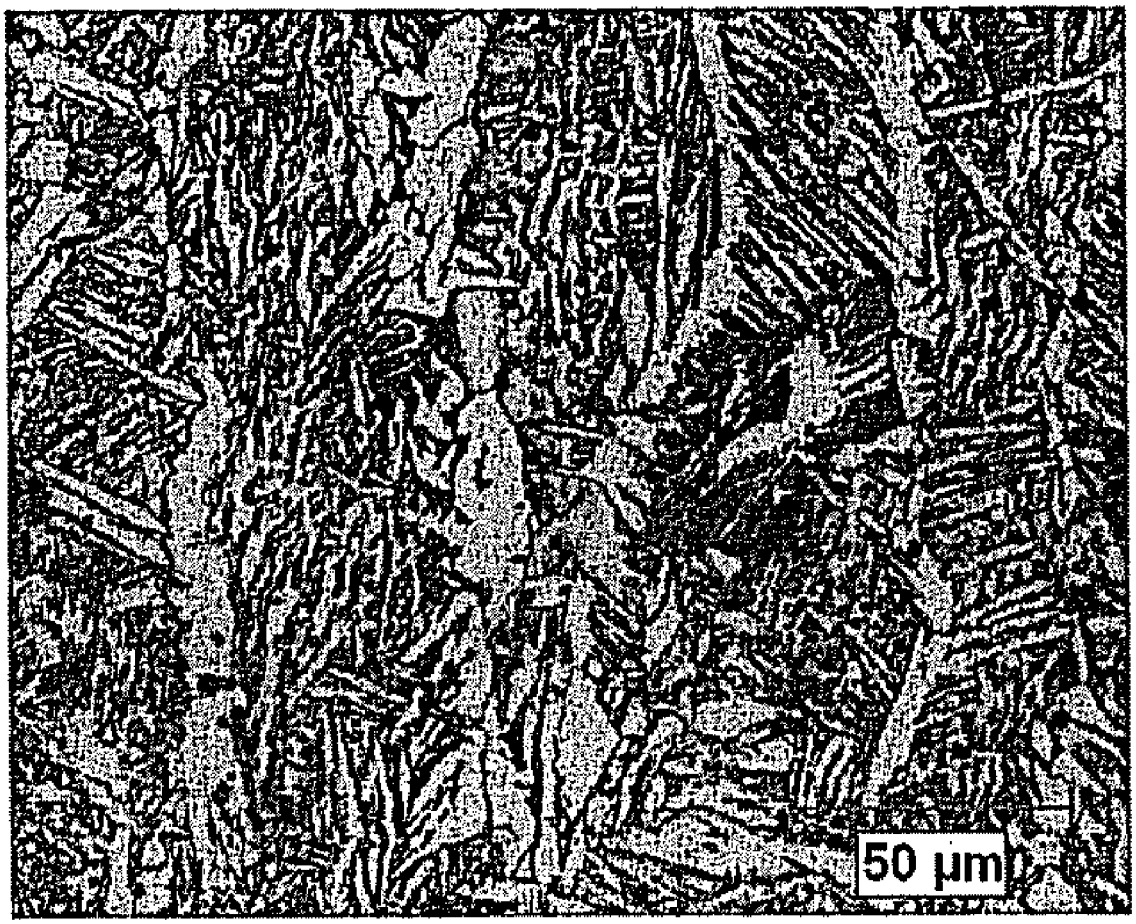
FIG. 1 is a photomicrograph showing the microstructure of the weld metal produced in the following Comparative Example A in which a welding wire of conventional composition was used to produce a weld metal deposit by means of a conventional self-shielded welding process.

TRIP steels are a well known class of steels, which are described in a variety of patents and other publications. See, for example, U.S. Pat. Nos. 5,505,796, 6,190,469, 6,328,826, 6,475,408, 6,767,652, 7,455,736, U.S. 2005/0081966, U.S. 2006/0130937, U.S. 2008/0023112, U.S. 2008/0251161, U.S. 2008/0199347, and Chatterjee, Transformation in TRIP-assisted Steels: Microstructure and Properties, PhD thesis, Darwin College, University of Cambridge, November 2006. The entire disclosures of each of these documents is incorporated herein by reference.

TRIP steels are characterized by three microconstituents before plastic deformation i.e., polygonal ferrite, bainite and retained austenite. Plastic deformation causes the retained austenite to transform progressively to into martensite, which is much harder, with essentially no formation of cementite ($Fe_3C$). The final microstructure is a combination of polygonal ferrite, bainite and martensite that inherits the composition of the retained austenite. Because of this complex phase structure and phase transformation, TRIP steels exhibit enhanced formability (i.e., the ability to form parts of complex geometry by plastic deformation) as well as greater ultimate tensile strengths and uniform elongation during plastic deformation, relative to similar high-strength steels.

As indicated in the above-noted Chatterjee thesis, early TRIP steels were highly alloyed (high concentrations of Cr, Ni and/or Mo) and can be characterized as having the following typical compositions in addition to Fe:

TABLE 1

Chemical Composition of Early TRIP Steels according to Chatterjee

| C | Si | Mn | Cr | Ni | Mo |
|---|----|----|----|----|----|
| 0.31 | 1.92 | 2.02 | 8.89 | 8.31 | 3.8 |
| 0.25 | 1.96 | 2.08 | 8.88 | 7.60 | 4.04 |
| 0.25 | 1.90 | 0.92 | 8.80 | 7.80 | 4.00 |
| 0.25 | — | — | — | 24.4 | 4.10 |
| 0.23 | — | 1.48 | — | 22.0 | 4.00 |
| 0.24 | — | 1.48 | — | 20.97 | 3.57 |

Later, more modern steels exhibiting the TRIP effect were developed with considerably less alloying ingredients, such steels being referred to by Chatterjee as "TRIP-assisted" steels. Typical compositions for such low alloy TRIP-assisted steels according to Chatterjee, in addition to Fe, are exemplified as follows:

TABLE 2

Chemical Composition of Modern TRIP Steels according to Chatterjee

| C | Si | Mn | Al | P | Nb | Mo | Cu |
|---|----|----|----|----|----|----|----|
| 0.38 | 1.53 | 0.83 | | 0.007 | | | |
| 0.18 | 2.0 | 1.5 | 0.037 | 0.015 | | | |
| 0.19 | 2.48 | 1.49 | 0.036 | 0.014 | | | |
| 0.11 | 0.59 | 1.55 | 1.5 | 0.012 | | | |
| 0.14 | 0.53 | 1.57 | | 0.204 | | | |
| 0.22 | 1.55 | 1.55 | 0.028 | | 0.035 | | |
| 0.20 | 1.47 | 1.51 | 0.028 | 0.004 | 0.047 | 0.2 | |
| 0.20 | 1.6 | 1.6 | 0.028 | | 0.041 | 0.3 | |
| 0.21 | 1.49 | 1.49 | 0.028 | 0.005 | 0.017 | 0.1 | |
| 0.14 | 1.49 | 1.51 | 0.04 | 0.0012 | | | 0.51 |

For the purposes of this disclosure, any steel exhibiting the TRIP effect, including both the high alloy early steels as well as the above low alloy modern steels, are referred to as "TRIP" steels.

See, also, U.S. 2008/0257110, which describes a typical modern TRIP steel as containing the following ingredients:

TABLE 3

Chemical Composition of TRIP Steels in U.S. 2008/0257110

| Ingredient | Amount, wt. % |
|---|---|
| C | 0.10-0.50 |
| Mn | 1.00-4.00 |
| Cr | 0.00-1.00 |
| Mo | 0.00-0.50 |
| Al | 1.00-5.00 |
| Ti | 0.00-0.20 |
| Nb | 0.00-0.20 |
| V | 0.00-0.20 |
| bal | Fe (+impurities) |

In accordance with this invention, workpieces made from any kind of TRIP steel can be welded so as to produce weld metals having compositions and microstructures approximating those of known TRIP steels. Generally speaking, such steels can be characterized as containing an appropriate balance between three different types or categories of alloying additions:

1. Carbon for strength and hardenability: generally in the range of 0.1 to 0.5%
2. Austenite stabilizers, e.g., Mn, Ni, for achieving a significant volume fraction of retained austenite before plastic deformation and for suppressing conversion of polygonal ferrite into unwanted phases: typically 0.8% to 4%
3. Cementite suppressors, e.g., Al, Co or Si, for suppressing carbide precipitation: typically 0.5% to 5.0%

Such steels can also contain other unspecified ingredients, so long as the TRIP effect of the steel is not lost.

Autogenous vs. Non-Autogenous Welding

Arc welding is a type of welding in which the heat used for melting the metal being welded is derived from an electric arc. In general, there are two broad categories of arc welding, those in which the weld is formed entirely from the workpiece being welded ("autogenous" welding) and those in which a significant part of the weld is derived from a weld filler material ("non-autogenous" welding). As indicated above, prior approaches for welding TRIP steels have focused on autogenous welding, not only because this insures an identical chemical composition in the weld but also because these techniques are commonly used in the automotive industry today.

Avoiding Contamination

Two basic approaches are used in arc welding for avoiding contamination of the molten weld metal with atmospheric oxygen and/or nitrogen, using a shielding gas and using a flux. When a shielding gas is used in autogenous welding, the process is normally referred to as gas tungsten arc welding (GTAW) or tungsten inert gas (TIG) welding, since the non-consumable electrode used is normally made from tungsten. When a shielding gas is used in non-autogenous welding, the process is normally referred to as gas metal arc welding (GMAW) or its subcategories metal inert gas (MIG) welding when the shielding gas is inert or metal active gas (MAG) welding when the shielding gas is reactive.

The other technique for preventing atmospheric contamination, i.e., using a flux, is not normally used in autogenous welding. Rather, it is almost always used in non-autogenous welding.

Three different approaches are used in non-autogenous welding for preventing atmospheric contamination with fluxes. In one approach, the flux is coated onto the surfaces of a separately supplied filler material. Manual metal arc welding (MMA) (also referred to as "stick" or shielded metal arc welding (SMAW)), in which the weld filler material in the form of a rod or stick is manually supplied to the welding site, is a good example of this approach.

In a second approach, referred to as submerged arc welding (SAW), atmospheric contamination is prevented by covering a seam to welded with a substantial layer of the flux. A consumable electrode is moved through the flux is such a way that the arc struck between the electrode and the workpiece remains totally submerged in the flux. Heat from the welding arc melts the flux, thereby producing a molten flux layer which shields the weld metal from atmospheric contamination, prevents spatter and sparks, and suppresses the intense ultraviolet radiation and fumes normally produced during arc welding. The molten flux layer also becomes electrically conductive, thereby providing a current path between the workpiece and the electrode.

A third approach for preventing atmospheric contamination with fluxes in non-autogenous welding is known as flux cored welding (FCAW). In FCAW, a consumable electrode is used as the filler material, this consumable electrode being shaped in the form of a hollow tubular sheath, with the flux being housed inside this sheath. Two different types of FCAW are used. In self shielded FCAW (FCAW-S), which is sometimes referred to as "dual shield" welding, no shielding gas is used since the flux contains ingredients that generate the necessary shielding gas at welding temperatures. In Gas Assisted FCAW (FCAW-G), a shielding gas is used.

Non-Autogenous Welds with TRIP Microstructure

As indicated above, prior approaches for welding TRIP steels have focused on autogenous welding. In accordance with this invention, non-autogenous welding is used to form welds that exhibit a composition and microstructure mimicking that of known TRIP steels.

As appreciated by skilled metallurgists, supersaturation of the retained austenite phase in a TRIP steel is achieved by the metallurgical processing steps that occur during manufacture of the steel. Initially, the ferrite+cementite structure in the steel is taken to a two phase ferrite+austenite region to form austenite and polygonal ferrite. This is done by maintaining the steel at an elevated temperature high enough to dissolve the cementite (iron carbide) and saturate the austenite with the carbon liberated from this dissolution. Although polygonal ferrite is a typical micro-constituent seen in TRIP steels, this feature is not critical to the TRIP effect.

The next step is quenching this two phase (austenite/polygonal ferrite) microstructure at an intermediate temperature to transform a part of the retained austenite into bainite isothermally. This transformation also results in supersaturation of the austenite with carbon due to the "dumping" of carbon from the bainite into the austenite. This bainitic transformation is critical, because the inter-lath regions between bainitic laths are supersaturated with carbon and are retained as high carbon austenite at room temperature. It is this transformation of the retained austenite that produces the TRIP effect. The overall result is that a mixed microstructure is formed composed of polygonal ferrite, bainite and retained austenite.

In the case of weld formation, however, it is not possible to carry out the stepped metallurgical processing routine that is necessary to form the TRIP microstructure. For example, it is not possible to form carbides (cementite) and then heat the weld metal long enough to dissolve these carbides, thereby further supersaturating the austenite. Nor is it possible to carry out the isothermal quenching necessary for bainite formation.

In accordance with this invention, however, it has been found that, by appropriately alloying the weld filler material, a suitable part of the austenite in the weld will inherently transform into bainite under the relatively fast, continuous cooling conditions encountered in conventional non-autogenous welding. In addition, carbides will not form under these conditions, thus keeping the carbon in solution and predominantly in the austenite. The two-phase structure formed thereby (bainite laths and interlath austenite regions supersaturated in carbon) possesses all the components need to achieve a strength and ductility approaching that of conventional TRIP steels. The soft polygonal ferrite normally found in the microstructure of TRIP steels is replaced in the welds made in accordance with this invention with bainitic ferrite having a high dislocation content, which is typically much stronger than polygonal ferrite.

In accordance with this invention, it has been found that the cooling rates experienced by the weld metal during cooling to ambient temperatures are slow enough to allow carbon to supersaturate the austenitic phase without formation of carbide precipitates but fast enough to prevent substitutional alloying elements like Mn, Ni, Al, Si from partitioning between the bainitic ferrite and austenite phases. This mode of transformation (in which only interstitial alloying elements have time to partition while the substitutional alloying additions do not) is called "paraequilibrium."

In effect, the austenite phase formed in a weld produced by the inventive process does not have time to form an equilibrium phase composition before cooling to room temperature, which is the reason for using a more/stronger austenite stabilizers like nickel and the like. Retaining supersaturated austenite in the welds produced by this invention is important in providing plasticity to the weldment ultimately produced.

As well known to metallurgists, some elements diffuse through an austenitic metal lattice interstitially, i.e., atoms of the diffusing element move through the open spaces between adjacent atoms in the metal's lattice structure. Other elements diffuse through an austenitic metal substitutionally, i.e., atoms of the diffusing metal move through the lattice by replacing specific atoms in the lattice. In accordance with this invention, it is has been found that, by appropriate selection of the chemistry of the weld filler material, the metallurgical conditions which the weld metal sees as it solidifies create a "paraequilibrium," i.e., these metallurgical conditions allow the interstitially diffusing elements (e.g., carbon) to partition between the bainite and supersaturated austenite phases but do not allow the substitutionally diffusing elements (e.g., nickel) to partition between these phases. If the welding conditions and/or weld chemistry were selected so as to allow complete equilibrium, i.e., equilibrium of both the interstitially and substitutionally diffusing elements between these two phases, ferrite stringers along the grain boundaries of the bainite laths and/or ferrite side plates (dendrites) would form, these ferrites having an equilibrium composition of all elements present as dictated by the phase diagram. Cementite (i.e., iron carbide precipitates) would also likely form in the austenite phase, in spite of the presence of the cementite suppressors (e.g., Al and Si). Once cementite forms, the austenite would become unstable and either transform to pearlite or martensite depending on alloy composition and cooling rates, thereby resulting in a loss of the improved plasticity and elongation characteristic of the welds formed by this invention.

This result is prevented in accordance with this invention by including enough austenite stabilizers (e.g., Ni and Mn) in the weld filler material to suppress the austenite to ferrite transformation. These additions slow the kinetics of diffusion of substitutional alloying additions forcing a paraequilibrium mode of transformation, thereby preventing formation of ferrite stringers and plates (dendrites) as well as the formation of iron carbide precipitates (cementite) as the weld metal cools to room temperature.

Accordingly, it will be understood that in this context of this disclosure, a "microstructure mimicking that of known TRIP steels" ("TRIP-mimicking microstructure") means a microstructure that (1) is predominantly formed from a mixture of bainite laths and interlath austenite regions supersaturated in carbon, and (2) when compared to the microstructure of an otherwise identical "equilibrium steel," i.e., a steel having an identical chemical composition but which has been held at elevated temperature long enough to allow its elements to come to a complete equilibrium distribution before cooling to ambient
   (a) does not contain cementite (iron carbide precipitates) in its austenite regions in any significant amount, and
   (b) does not contain ferrite stringers at the grain boundaries between its bainite laths in any significant amount.

Because of this modified microstructure, the weld metal so made will exhibit a greater plasticity and a larger uniform strain than the otherwise identical equilibrium steel mentioned above.

Incidentally, it is well known to skilled welding engineers that the composition of a weld produced by non-autogenous welding depends on a number of factors including the composition of the weld filler material used, the composition of the flux and/or shielding gas used, and the particular type of non-autogenous welding procedure used. In addition, it is also well known that the composition of the weld can be determined fairly precisely by suitably selecting and coordinating these variables. Accordingly, the inventive process is described in this document in terms of the chemical composition of the weld ultimately produced, it being understood that a skilled welding engineer can easily achieve this chemical composition by suitable adjustment the above variables in accordance with known techniques.

Turning now to specifics, it has been found in accordance with this invention that a weld formulated to contain about 0.19 wt. % C, 1.0 wt. % Al, 1.7 wt. % Ni, 1.0 wt. % Si, 0.50 wt. % Mn, with the balance being Fe and incidental impurities, when produced using a flux cored welding approach, exhibits a microstructure approximating that of conventional TRIP steels, even though the weld has not been subjected to plastic deformation. Different amounts of these ingredients can be used, and additional ingredients can be included, provided that a suitable balance is maintained between the non-carbon austenite stabilizers and the cementite suppressors to insure that the desired TRIP-mimicking microstructure is obtained.

In this regard, Al and Si are known to prevent formation of cementite precipitates ($Fe_3C$) in TRIP steels. Therefore, enough of these cementite suppressors should be used to insure that formation of cementite precipitates in the welds produced by the inventive process is essentially avoided. Normally, this means that the total amount of Al and Si in the weld should be at least about 1.0 wt. %, although greater amounts may be necessary depending on the type and amounts of other ingredients present. Al and Si are also known to stabilize the δ phase (ferrite) microstructure of a steel at the expense of its γ phase (austenite). If too much δ phase (ferrite) is present, insufficient austenite will form and the steel will develop dendrites. Since dendrites must also be avoided in TRIP steels, the total amount of Al and Si used in the inventive process should not be so much that unwanted dendrites form. In general, this means that the total amount of Al and Si in the weld should not be greater than about 6.0 wt. %, although lesser maximums may be necessary depending on the type and amounts of other ingredients present. Generally speaking, therefore, and depending on the particular type of autogenous welding procedure used, the weld filler material and optional flux and/or shielding gas should be selected so that the combined amounts of Si and Al in the weld produced are about 1.0-6.0 wt. %, more typically about 1.3-5.0 wt. %, 1.5-4.0 wt. %, 1.7-3.0 wt. %, or even 1.8-2.5 wt. %.

Al is also known to be an oxygen and nitrogen scavenger. Al is not purposely included in steel welds made by most non-autogenous welding processes, since the flux or shielding gas used is normally sufficient to prevent atmospheric contamination. However, Al is normally included in the consumable electrodes used in self shielded flux cored arc welding (FCAW-S), since an elevated level of oxygen and nitrogen scavenging is usually necessary in this particular process. Normally, enough Al is included in these electrodes to produce welds containing at least about 0.5 wt. % Al, and more typically at least about 0.7 wt. %. Accordingly, if the particular welding procedure selected for use in carrying out the inventive process is FCAW-S, then enough Al should be included in the filler material and/or flux to prevent such oxygen and/or nitrogen contamination from occurring, which will typically correspond to an Al concentration in the weld produced of at least about 0.7 wt. %.

Phosphorous is also known to suppress formation of cementite precipitates ($Fe_3C$) in TRIP steels. Therefore, phosphorous may be used in addition to, or in lieu of, the Al and/or Si in the inventive process. If so, the amount of P used is preferably no more than about 50 wt. %, more preferably no more than 25 wt. % or even 10 wt. % of the combined weight of all cementite suppressors in the weld.

Manganese and nickel function as γ phase (austenite) stabilizers in TRIP steels. Stabilizing the γ phase (austenite) allows more δ phase stabilizers (Al & Si) to be included in the steel for suppressing formation of cementite precipitates. Accordingly, the amount of Mn and/or Ni used in this invention should be sufficient to achieve the desired austenitic phase while still allowing enough δ phase stabilizers (Al & Si) to also be present for suppressing cementite formation. Normally, this means that the combined amounts of Mn and Ni used in the inventive process should be at least about 1.0 wt. %, but will more typically be at least about 1.3, 1.5 or even 1.8 wt. %, depending on the other ingredients present. Manganese and Nickel are solid solution strengtheners and increase hardenability. Increased amounts of manganese will result in elimination of the ferrite phase at intermediate levels and subsequent minimization of the bainite phase at even higher levels. This would result in a microstructure that is a combination of austenite and martensite. This is undesirable as the ability to have a combination of bainite and retained austenite is what makes the possibility of high strength and ductility possible. Therefore, the combined amounts of Mn and Ni used in this invention will normally be no more than 6.0 wt. %, but will more typically be no more than, 4.0 wt. %, 3.0 wt. % or even 2.5 wt. %. Thus, the combined amounts of Mn and Ni in the weld produced by the present invention will generally.be about 1.3-0.6.0 wt. %, 1.5-4.0 wt. %, 1.7-3.0 wt. %, or even 1.8-2.5 wt. %, depending on the other elements present in the weld ultimately produced.

Also, although Mn and Ni can be used individually in this invention (i.e., the weld can be made to contain only one or the other), it is desirable that both Mn and Ni be used. If so, the Ni content of the weld will normally comprise 10-90 wt. %, more typically 40-85 wt. %, or even 55-80 wt. % of the combined Mn and Ni content of the weld. Embodiments in which the Ni content of the weld is greater than 50 wt. % of the combined Mn and Ni content of the weld are also interesting.

As indicated above, the desired TRIP-mimicking microstructure of the welds produced by the inventive process are developed through an appropriate balance of its γ phase (austenite) stabilizers (e.g., Mn and Ni) and its cementite suppressors (e.g., Al and Si). Therefore, the relative amounts of these γ phase stabilizers, on the one hand, and these cementite suppressors, one the other hand, will normally be about 2:1-1:2 on a weight basis, more typically about 1.5:1-1:1.4, even more typically about 1.2:1-1:1.15, or even 1.1:1-1:1. Incidentally, carbon is not included in this calculation, even though it also exhibits an austenite (γ phase) stabilizing function, as further discussed below.

Carbon also functions as an austenite (γ phase) stabilizer and the primary strengthening addition for the martensite that forms from austenite. In addition, it is a component of cementite ($Fe_3C$). Therefore, the amount of carbon included in the welds produced by the inventive process should be enough to achieve the desired austenitic phase but not so much that excessive amounts of cementite precipitates form. Normally, the amount of C contained in TRIP steels is less than 1 wt. % (<1 wt. %) and may be as low as 0.02 wt. %. In the inventive process, similar as well as greater amounts of C can be used. So, for example, the amount of C used in the inventive process should be sufficient to produce a carbon concentration in the weld ultimately obtained of about 0.02 to 0.20 wt. %, with concentrations on the order of 0.1-0.20 wt. % being more typical.

In addition to these ingredients, other known ingredients of TRIP steels can be included in the welds made by this invention, provided that they do not adversely affect the microstructure of these welds in any significant way. For example, niobium, molybdenum and boron can be included for increasing the quantity of retained austenite, while boron can be included for improving hardenability and enhancing the TRIP effect.

As indicated above, it has been found in accordance with this invention that non-autogenous welds can be made in TRIP steels with microstructures mimicking those of the underlying TRIP steel after plastic deformation, even though the weld has not undergone plastic deformation, by appropriately balancing the austenite stabilizers and the cementite suppressors in the weld. Thus it is possible in accordance with this invention to produce continuous welds exhibiting the physical properties of those of known TRIP steels after plastic deformation, i.e., ultimate tensile strengths (UTS) of at least about 100 ksi (~700 MPa), more preferably at least about 105 ksi or even at least about 110 ksi, and % elongations of at least about 15%, more preferably at least about 18% or even at least about 20% in a uniaxial tensile test.

Moreover, because non-autogenous welding processes are used, continuous welds (e.g., lap welds, butt welds and seam welds) can be made with higher deposition rates and moreover larger gaps can be filled than is possible when autogenous welding processes are used.

WORKING EXAMPLES

In order to more thoroughly describe this invention, the following working examples are provided:

Example 1 and Comparative Examples A and B

Three different flux cored welding wires, each measuring 2.0 mm in diameter and containing the same flux, were used to produce weld metal deposits using a self-shielded arc welding procedure. The weld deposits were laid down using a multiple pass procedure so as to produce dilution free weld metals.

Three different welding wires were used, each intentionally being alloyed with aluminum to protect the arc and the molten weld metal from atmospheric nitrogen and oxygen. The first welding wire (Comparative Example A) exemplifies a standard, conventional self shielded flux cored welding wire. In Comparative Example B, the standard welding wire was modified by adding silicon to its chemical composition to suppress cementite precipitation. In Example 1 representing this invention, silicon was added to the standard welding wire to suppress cementite precipitation, as in Comparative Example B, but in addition nickel was also added as an austenite stabilizer.

The chemical compositions of the weld metals obtained in each experiment are set forth in the following Table 4:

TABLE 4

Example 1 and Comparative Examples A and B
Weld Metal Chemical Compositions

| | Wt % | | | | | |
|---|---|---|---|---|---|---|
| | % C | % Al | % Si | % Al + Si | % Ni | % Mn | % Ni + Mn |
| Comp A | 0.2 | 1 | 0.1 | 1.1 | 0.1 | 0.5 | 1.5 |
| Comp B | 0.2 | 1 | 1.0 | 2.0 | 0.1 | 0.5 | 1.5 |
| Ex 1 | 0.2 | 1 | 1.0 | 2.0 | 1.7 | 0.5 | 2.2 |

Figure 2:
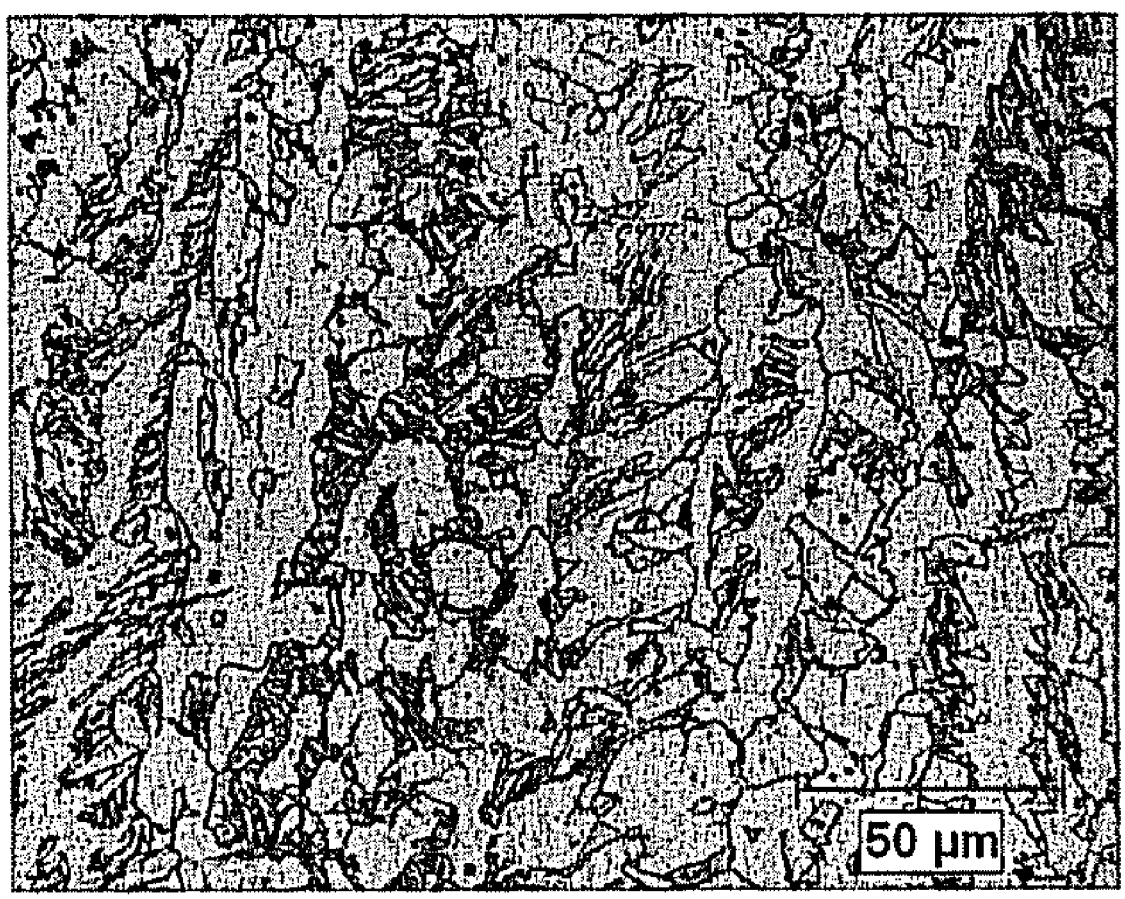
FIG. 2 is a photomicrograph similar to FIG. 1 showing the microstructure of the weld metal produced in the following Comparative Example B in which silicon was added to the conventional welding wire used in Comparative Example A.
Figure 3:
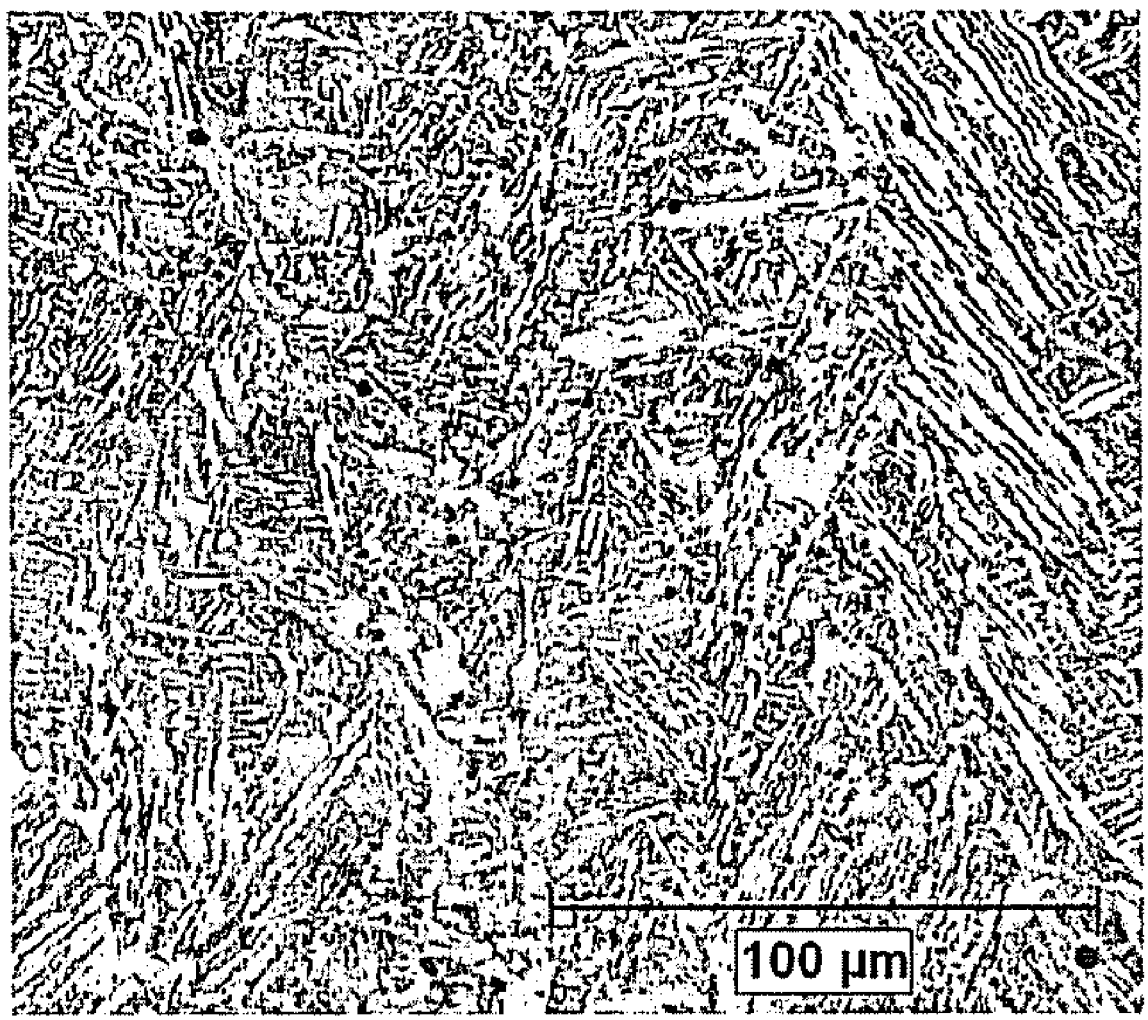
FIG. 3 is a photomicrograph similar to FIGS. 1 and 2 showing the microstructure of the weld metal produced in the following working Example 1 in which the welding wire was formulated to contain an appropriate balance of cementite suppressors and austenite stabilizers in accordance with this invention.

Optical micrographs showing the microstructure of each weld metal and are reproduced in FIGS. 1-3, respectively. As shown in FIG. 1 (Comparative Example A), the microstructure is comprised of extensive grain boundary ferrite and parallel ferritic laths nucleating off of the grain boundary ferrite (widmanstatten ferrite).

Meanwhile, FIG. 2 shows that extensive dendritic delta ferrite grains were produced in the weld metal of Comparative Example 2. This indicates that the solidification path of this metal did not pass through the single phase austenite region of its phase diagram, which in turn is responsible for the delta ferrite phase being retained when the metal cooled to room temperature.

In contrast, FIG. 3 shows that addition of a strong austenite stabilizer (nickel), together with silicon, in accordance with this invention produces a microstructure having the classical upper bainite morphology along with regions of acicular ferrite. That is, FIG. 3 shows a microstructure that is predominantly bainitic, with significant amounts of retained austenite being present between the bainitic laths and also in isolated regions along the prior austenite grain boundaries. This microstructure mimics that of conventional TRIP steels, which in turn allows the welds produced by this invention to exhibit similar TRIP properties.

In this regard, the strength and ductility of the weld metal produced in Example 1, which were determined according to ASTM E8, are shown in the following Table 5:

TABLE 5

Mechanical Properties of the Example 1 Weld Metal

| YS | UTS | % Elong |
|---|---|---|
| 93 ksi (642 MPa) | 113 ksi (780 MPa) | 20 |

As can be seen from this table, the weld metal obtained by this invention exhibited mechanical properties approaching those of conventional TRIP steels.

Although only a few embodiments of this invention have been described above, it should be appreciated that many modifications can be made without departing from the spirit and scope of the invention. All such modifications are intended to be included within the scope of this invention, which is to be limited only by the following claims:

The invention claimed is:

1. A non-autogenous arc welding process for forming a weld in a workpiece made from a TRIP steel in which an iron-based filler material is melted by an electric arc in the presence of a flux and the molten material formed thereby solidified to form a weld, the weld exhibiting an ultimate tensile strength of at least about 100 ksi and a % elongation of at least about 15%, wherein the filler material and flux are selected so that the weld obtained contains
    (a) about 0.02 to 0.20 wt. % C,
    (b) at least about 0.7 wt. % Al,
    (c) Si in an amount such that the combined amounts of Si and Al in the weld is about 1.7-3.0 wt. %,
    (d) Mn and Ni in amounts such that the combined amounts of Ni and Mn in the weld is about 1.7-3.0 wt. %, wherein the amount of Ni in the weld is 55-80% of the combined amounts of Ni and Mn in the weld, and further
    wherein the weight ratio of Ni and Mn to Al and Si in the weld is about 1.2:1-1:1.15.

2. The process of claim 1, wherein
    the combined amounts of Si and Al in the weld is about 1.8-2.5 wt. %,
    the combined amounts of Ni and Mn in the weld is about 1.8-2.5 wt. %, and
    the weight ratio of Ni and Mn to Al and Si in the weld is about 1.1:1-1:1.

3. The process of claim 2, wherein the weld contains about 0.19 wt. % C, about 1.0 wt. % Al, about 1.7 wt. % Ni, about 1.0 wt. % Si, and about 0.5 wt. % Mn, with the balance being Fe and incidental impurities.

4. The process of claim 3, wherein the weld is formed in the absence of a shielding gas by self-shielded arc welding.

5. The process of claim 2, wherein the weld is formed in the absence of a shielding gas by self-shielded arc welding.

6. The process of claim 1, wherein the weld is formed in the absence of a shielding gas by self-shielded arc welding.

7. A non-autogenous arc welding process for forming a weld in a workpiece made from a TRIP steel in which an iron-based filler material is melted by an electric arc in the presence of a flux and the molten material formed thereby solidified to form a weld, the weld exhibiting an ultimate tensile strength of at least about 100 ksi and a % elongation of at least about 15%, wherein the filler material and flux are selected so that the weld obtained contains
(a) about 0.02 to 0.20 wt. % C,
(b) at least about 0.5 wt. % Al,
(c) Si in an amount such that the combined amounts of Si and Al in the weld is about 1.0-6.0 wt. %,
(d) Mn and Ni in amounts such that the combined amounts of Ni and Mn in the weld is about 1.3-6.0 wt. %, wherein the amount of Ni in the weld is 10-90% of the combined amounts of Ni and Mn in the weld, and further
wherein the weight ratio of Ni and Mn to Al and Si in the weld is about 2:1-1:2, and further wherein the weld is formed by flux cored arc welding.

8. The process of claim 7, wherein the weld is formed in the absence of a shielding gas by self-shielded arc welding.

9. A non-autogenous arc welding process for forming a weld in a workpiece made from a TRIP steel in which an iron-based filler material is melted by an electric arc in the presence of a flux and the molten material formed thereby solidified to form a weld, the weld exhibiting an ultimate tensile strength of at least about 100 ksi and a % elongation of at least about 15%, wherein the filler material and flux are selected so that the weld obtained contains
(a) about 0.02 to 0.20 wt. % C,
(b) at least about 0.7 wt. % Al,
(c) Si in an amount such that the combined amounts of Si and Al in the weld is about 1.5-4.0 wt. %
(d) Mn and Ni in amounts such that the combined amounts of Ni and Mn in the weld is about 1.5-4.0 wt. %, wherein the amount of Ni in the weld is greater than the amount of Mn in the weld, and further
wherein the weight ratio of Ni and Mn to Al and Si in the weld is about 1.2:1-1:1.5.

10. The process of claim 1, wherein the weld produced exhibits an ultimate tensile strength of at least about 105 ksi and a % elongation of at least about 18%.

11. The process of claim 10, wherein the weld produced exhibits an ultimate tensile strength of at least about 110 ksi and a % elongation of at least about 20%.

12. The process of claim 11, wherein the TRIP steel being welded contains manganese and optionally nickel, and further wherein the combined amounts of manganese and nickel in the TRIP still is about 0.8 to 4 wt. %.

13. A non-autogenous arc welding process for forming a weld in a workpiece made from a TRIP steel in which an iron-based filler material is melted by an electric arc in the presence of a flux and the molten material formed thereby solidified to form a weld, the weld exhibiting an ultimate tensile strength of at least about 100 ksi and a % elongation of at least about 15%, wherein the filler material and flux are selected so that the weld obtained contains
(a) about 0.02 to 0.20 wt. % C,
(b) at least about 0.7 wt. % Al,
(c) Si and optionally P, wherein the combined amounts of Si, Al and P in the weld is about 1.7-3.0 wt. %, and further wherein the amount P in the weld is no greater than 50 wt. % of the combined amounts of Si, Al and P in the weld,
(d) Mn and Ni in amounts such that the combined amounts of Ni and Mn in the weld is about 1.7-3.0 wt. %, wherein the amount of Ni in the weld is 55-80% of the combined amounts of Ni and Mn in the weld, and further
wherein the weight ratio of Ni and Mn to Si, Al and P in the weld is about 1.2:1-1:1.15.

14. The process of claim 13, wherein
the combined amounts of Si, Al and P in the weld is about 1.8-2.5 wt. %,
the combined amounts of Ni and Mn in the weld is about 1.8-2.5 wt. %., and
the weight ratio of Ni and Mn to Si, Al and P in the weld is about 1.1:1-1:1.

15. The process of claim 13, wherein the TRIP steel being welded contains manganese and optionally nickel, and further wherein the combined amounts of manganese and nickel in the TRIP still is about 0.8 to 4 wt. %.

16. A non-autogenous arc welding process for forming a weld in a workpiece made from a TRIP steel in which an iron-based filler material is melted by an electric arc in the presence of a flux and the molten material formed thereby solidified to form a weld, the weld exhibiting an ultimate tensile strength of at least about 100 ksi and a % elongation of at least about 15%, wherein the filler material and flux are selected so that the weld obtained contains
(a) about 0.02 to 0.20 wt. % C,
(b) at least about 0.7 wt. % Al,
(c) Si and optionally P, wherein the combined amounts of Si, Al and P in the weld is about 1.5-4.0 wt. %, and further wherein the amount P in the weld is no greater than 50 wt. % of the combined amounts of Si, Al and P in the weld,
(d) Mn and Ni in amounts such that the combined amounts of Ni and Mn in the weld is about 1.5-4.0 wt. %, wherein the amount of Ni in the weld is >50% of the combined amounts of Ni and Mn in the weld, and further
wherein the weight ratio of Ni and Mn to Si, Al and P in the weld is about 1.5:1-1:1.4.

17. The process of claim 16, wherein the TRIP steel being welded contains manganese and optionally nickel, and further wherein the combined amounts of manganese and nickel in the TRIP still is about 0.8 to 4 wt. %.

* * * * *